United States Patent
Lee et al.

(10) Patent No.: US 10,120,142 B2
(45) Date of Patent: Nov. 6, 2018

(54) OPTICAL TRANSCEIVER MODULE WITH DUAL BAND PASS WDM COUPLER EMBEDDED THEREIN

(71) Applicant: LIGHTRON FIBER-OPTIC DEVICES INC, Daejeon (KR)

(72) Inventors: Dong-Hyun Lee, Sejong-si (KR); Jin-Soo Choi, Daejeon (KR); Yoon-Koo Kwon, Chungcheongbuk-do (KR)

(73) Assignee: LIGHTRON FIBER-OPTIC DEVICES INC, Daejon (KR)

(*) Notice: Subject to any disclaimer, the term of this patent is extended or adjusted under 35 U.S.C. 154(b) by 43 days.

(21) Appl. No.: 15/246,117

(22) Filed: Aug. 24, 2016

(65) Prior Publication Data

US 2017/0063485 A1    Mar. 2, 2017

(30) Foreign Application Priority Data

Aug. 24, 2015 (KR) .................. 10-2015-0118612

(51) Int. Cl.
*H04B 10/00* (2013.01)
*H04J 14/00* (2006.01)
(Continued)

(52) U.S. Cl.
CPC ......... *G02B 6/4206* (2013.01); *G02B 6/2938* (2013.01); *G02B 6/29361* (2013.01); *G02B 6/32* (2013.01); *G02B 6/4246* (2013.01); *H04B 10/40* (2013.01); *H04J 14/0209* (2013.01); *H04J 14/0213* (2013.01); *H04B 10/071* (2013.01); *H04J 14/02* (2013.01)

(58) Field of Classification Search
CPC .. G02B 6/4204; G02B 6/4246; G02B 3/0087; G02B 6/32; G02B 6/34; H04B 10/2918; H04B 10/40; H04B 10/25; H04J 14/0216; H04J 14/00
USPC ...................... 398/88, 135, 72, 82
See application file for complete search history.

(56) References Cited

U.S. PATENT DOCUMENTS

| 6,454,465 B1 * | 9/2002 | Uschitsky | G02B 6/29364 385/34 |
| 6,847,453 B2 * | 1/2005 | Bush | G01B 11/0675 356/479 |

(Continued)

FOREIGN PATENT DOCUMENTS

| KR | 101227182 B1 * | 1/2013 | ........... G02B 6/4206 |
| KR | 20130012634 A * | 2/2013 | ........... G02B 6/4206 |

(Continued)

*Primary Examiner* — Ken N Vanderpuye
*Assistant Examiner* — Abbas H Alagheband
(74) *Attorney, Agent, or Firm* — McCoy Russell LLP

(57) ABSTRACT

Provided is an optical transceiver module having a dual band pass WDM coupler embedded therein, wherein the dual band pass WDM coupler provides pass bands for selectively passing a transmission signal output from an optical transmitting unit, and an optical signal having a specific wavelength received by an optical receiving unit among optical signals input through a common port. According to the present invention, a size and cross-talk of the optical transceiver module may be reduced, and the optical transceiver module may be used as a video transceiver in an optical subscriber network according to an ITU-RG.983.3 standard.

4 Claims, 4 Drawing Sheets

(51) Int. Cl.
  *H04J 14/02* (2006.01)
  *G02B 6/42* (2006.01)
  *H04B 10/40* (2013.01)
  *G02B 6/293* (2006.01)
  *G02B 6/32* (2006.01)
  *H04B 10/071* (2013.01)

(56) References Cited

U.S. PATENT DOCUMENTS

| | | | | |
|---|---|---|---|---|
| 6,882,774 | B2* | 4/2005 | Tai | G02B 6/2937 385/33 |
| 7,044,660 | B2* | 5/2006 | Pan | G02B 6/4201 359/341.3 |
| 7,103,246 | B1* | 9/2006 | Zhu | G02B 6/2937 385/33 |
| 7,130,121 | B2* | 10/2006 | Pan | G02B 6/4201 359/484.04 |
| 8,532,489 | B2* | 9/2013 | Cheng | H04J 14/0209 398/72 |
| 8,805,191 | B2* | 8/2014 | Ho | G02B 6/4204 398/128 |
| 9,391,695 | B2* | 7/2016 | Piehler | H04B 10/071 |
| 2003/0086093 | A1* | 5/2003 | Bush | G01B 11/0675 356/479 |
| 2003/0103725 | A1* | 6/2003 | Li | G02B 6/2937 385/34 |
| 2004/0109640 | A1* | 6/2004 | Tai | G02B 6/2937 385/33 |
| 2005/0280888 | A1* | 12/2005 | Pan | G02B 6/4201 359/337 |
| 2006/0093369 | A1* | 5/2006 | Nagarajan | H04B 10/43 398/135 |
| 2006/0158718 | A1* | 7/2006 | Pan | G02B 6/4201 359/341.1 |
| 2008/0031625 | A1* | 2/2008 | Okuda | G02B 6/12007 398/71 |
| 2013/0084070 | A1* | 4/2013 | Ho | G02B 6/4204 398/68 |
| 2015/0016816 | A1* | 1/2015 | Piehler | H04B 10/071 398/10 |
| 2015/0071650 | A1* | 3/2015 | Kim | H04B 10/2503 398/135 |
| 2016/0097901 | A1* | 4/2016 | Lu | H04J 14/0282 385/18 |

FOREIGN PATENT DOCUMENTS

KR 1020130012634 A 2/2013
KR 101285766 B1 7/2013

* cited by examiner

OPTICAL TRANSCEIVER MODULE WITH DUAL BAND PASS WDM COUPLER EMBEDDED THEREIN

CROSS-REFERENCE TO RELATED APPLICATIONS

This application claims priority under 35 U.S.C. § 119 to Korean Patent Application No. 10-2015-0118612, filed on Aug. 24, 2015, in the Korean Intellectual Property Office. The disclosure of which is incorporated herein by reference in its entirety for all purposes.

TECHNICAL FIELD

The present invention relates to an optical transceiver module having a dual band pass wavelength division multiplexing (WDM) coupler embedded therein, and more particularly, to an optical transceiver module having a dual band pass WDM coupler embedded therein, wherein the dual band pass WDM coupler provides pass bands for selectively passing a transmission signal output from an optical transmitting unit, and an optical signal having a specific wavelength received by an optical receiving unit among optical signals input through a common port.

BACKGROUND ART

In order to satisfy a demand on data traffic which is recently increased, and a demand on various multimedia services such as a smart mobile phone, a high performance television (e.g., high definition TV, a 3D TV, a smart TV, etc.), an electronic commerce, a video on demand (VOD), and the like, it is required to extend capacity of an existing optical communication network.

For this reason, a wavelength-division multiplexing (WDM) technology among various optical communication system technologies which are proposed up to now has been recognized as an ultimate alternative for satisfying the above-mentioned demands.

The WDM technology is a technology in which optical signals having different wavelengths are bound to a piece of optical fiber to thereby be transmitted, and because the WDM technology provides a dedicated channel of point-to-point by allocating a unique independent wavelength to each subscriber and uses a unique optical wavelength for each of the subscribers, it may provide highest transmission speed among transmission technologies which are proposed up to now.

For example, since a WDM-passive optical network (PON) technology uses more wavelengths than a time-division multiplexing (TDM)-PON, which is a time-division manner such as Ethernet-PON (E-PON) and Gigabit-PON (G-PON), it may guarantee a bidirectional symmetrical service, and since the WDM-PON technology independently allocates a bandwidth and only the corresponding subscriber receives the optical signal having different wavelengths, the WDM-PON technology has an advantage that security is excellent.

One of the most important requirements in the WDM-PON technology is that optical terminals need to be able to selectively transmit and receive a wavelength of the used optical signal.

In order to use a video transceiver in an optical subscriber network according to ITU-RG.983.3 standard, an external WDM coupler should be connected to a bidirectional optical transceiver element.

Here, an uplink signal transmitted from the subscriber to a central station, and a downlink signal transmitted from the central station to the subscriber generally use optical signals having different wavelengths. In this case, for example, in the light of the subscriber, the optical signal transmitted to the central station and the optical signal received from the central station need to be able to be wavelength-selectively transmitted and received, and a development of an optical transceiver module having a low concern about an occurrence of cross-talk while following an existing communication standard which is used as it is, in the above-mentioned process is required.

FIG. 1 is a view illustrating an independent external filter box in which a plurality of WDM couplers are combined in multiple stages to provide separate pass bands for passing a transmission signal and a reception signal according to the related art. However, as illustrated in FIG. 1, in a case in which the WDM couplers are implemented in the multiple stages to provide the pass bands for selectively passing optical signals having two different wavelengths, there are problems in that an entire size of the optical transceiver module configured to have the WDM couplers embedded therein cannot help being increased, optical insertion loss for the pass band which is more than about 0.8 to 1.5 dB compared to the dual band pass WDM coupler occurs due to the use of the plurality of couplers, and the optical transceiver module is expensive.

Meanwhile, Patent Document 1 (Korean Patent Laid-Open Publication No. 2013-0012634) discloses an optical transceiver module in which a wavelength multiplexing element and a bidirectional optical transceiver element are integrated. However, Patent Document 1 merely discloses only a method capable of increasing optical coupling efficiency between a laser diode TO-Can and a GRIN lens by disposing a parallel optical lens between laser diode TO-Can and the GRIN lens, and does not disclose a method capable of increasing reliability of a bidirectional optical transmission and reception by providing the pass band for selectively passing two different wavelengths (i.e., a wavelength of a transmission signal and a wavelength of a reception signal).

RELATED ART DOCUMENT

Patent Document

KR 2013-0012634 A (2013 Feb. 5.)

DISCLOSURE

Technical Problem

An embodiment of the present invention is directed to providing an optical transceiver module providing pass bands for selectively passing a transmission signal output from an optical transmitting unit, and an optical signal (i.e., a reception signal) having a specific wavelength received by an optical receiving unit among optical signals input through a common port, without combining WDM couplers in multiple stages as in the related art.

An embodiment of the present invention is directed to providing an optical transceiver module having a low concern of an occurrence of cross-talk while following an existing communication standard which is used as it is.

An embodiment of the present invention is directed to allowing the optical transceiver module according to the present invention to be used as a video transceiver in an optical subscriber network according to an ITU-RG.983.3 standard.

Technical Solution

In one general aspect, an optical transceiver module having a dual band pass wavelength division multiplexing (WDM) coupler embedded therein includes: the dual band pass WDM coupler including a common port, a C lens converting optical signals input to the common port into parallel light, a dual band pass WDM filter passing an optical signal having a specific wavelength among the optical signals converted into the parallel light by the C lens and reflecting optical signals having other wavelengths, and a reflection port allowing the optical signals reflected by the dual band pass WDM filter and concentrated by the C lens to be incident thereon and to be output therefrom; an optical transmitting unit outputting a transmission signal; a parallel light lens converting the transmission signal output from the optical transmitting unit into parallel light; a WDM filter installed to be inclined with respect to a moving direction of the transmission signal converted into the parallel light by the parallel light lens, to thereby pass the transmission signal converted into the parallel light and reflect the optical signal having the specific wavelength passing through the dual band pass WDM filter; and an optical receiving unit receiving the optical signal having the specific wavelength reflected by the WDM filter, wherein the dual band pass WDM filter passes the transmission signal passing through the WDM filter, and the C lens concentrates the transmission signal passing through the dual band pass WDM filter to allow the concentrated transmission signal to be incident on the common port.

The optical transceiver module may further include an optical filter unit for optical reception disposed between the WDM filter and the optical receiving unit to pass only an optical signal having a wavelength allocated to the optical receiving unit among the optical signals having the specific wavelength reflected by the WDM filter.

The optical transceiver module may further include a condensing lens concentrating the optical signals having the specific wavelength reflected by the WDM filter, wherein the optical filter unit for optical reception is disposed between the condensing lens and the optical receiving unit to pass only the optical signal having the specific wavelength allocated to the optical receiving unit among the optical signals having the specific wavelength concentrated by the condensing lens.

The transmission signal output from the optical transmitting unit and incident on the common port may have a wavelength of 1610 nm, the optical signals input to the common port may have wavelengths of 1270 nm, 1310 nm, 1490 nm, 1550 nm, and 1577.5 nm, the optical signal passing through the dual band pass WDM filter and received by the optical receiving unit among the optical signals input to the common port may have a wavelength of 1550 nm, and the optical signals reflected by the dual band pass WDM filter and concentrated by the C lens to be incident on the reflection port and output from the reflection port may have the wavelengths of 1270 nm, 1310 nm, 1490 nm, and 1577.5 nm.

Advantageous Effects

According to the present invention, since the dual band pass WDM coupler embedded in the optical transceiver module provides the pass bands for selectively passing the wavelength of the transmission signal output from the optical transmitting unit, and the wavelength of the optical signal input through the common port and received by the optical receiving unit, there is no need to combine the WDM couplers in the multiple stages as in the related art. Accordingly, according to the present invention, it is possible to reduce the size of the optical transceiver module compared to the related art, to save costs, and to prevent optical insertion loss for the pass band from being increased.

Further, since the dual band pass WDM coupler that selectively performs the pass and the reflection of the optical signal is coupled to the optical transceiver elements without modifying a basic configuration of the optical transmitting unit, the optical receiving unit, and the WDM filter which are used for the bidirectional optical transmission and reception, the optical transceiver module may follow the existing communication standard which is used as it is, and may decrease the cross-talk which may be caused upon performing the bidirectional optical transmission and reception at the same time.

In addition, in the case in which the optical filter unit for optical reception is disposed between the WDM filter and the optical receiving unit, since it may be interrupted that the optical signal having the wavelength other than the wavelength allocated to the optical receiving unit is input to the optical receiving unit, reliability of the bidirectional optical transmission and reception may be further increased.

Furthermore, in the case in which the optical filter unit for optical reception is disposed between the condensing lens and the optical receiving unit, the optical signal having the specific wavelength reflected by the WDM filter may be concentrated by the condensing lens to be incident on the optical receiving unit, and the occurrence of the ripple in the pass band provided by the optical filter unit for optical reception may be decreased at the same time.

In addition, in the case in which the transmission signal having the wavelength of 1610 nm is output from the optical transmitting unit to be incident on the common port, and the optical receiving unit receives the optical signal having the wavelength of 1550 nm, the optical transceiver module according to the present invention may be used as the video transceiver in the optical subscriber network according to the ITU-RG.983.3 standard.

BEST MODE

Figure 1:
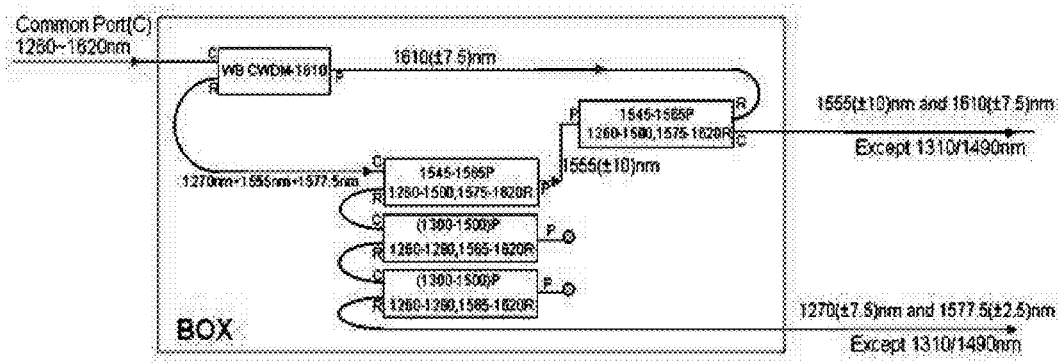
FIG. 1 is a view illustrating an independent external filter box in which a plurality of WDM couplers are combined in multiple stages to provide separate pass bands for passing a transmission signal and a reception signal according to the related art.

Hereinafter, an optical transceiver module having a dual band pass WDM coupler according to the present invention embedded therein will be described in detail with reference to the accompanying drawings. The accompanying drawings are provided to sufficiently convey the technical spirit of the present invention to those skilled in the art, and the present invention is not limited to the accompanying drawings, but may be implemented in other forms within the scope without departing from the technical spirit of the present invention.

In addition, the same reference numeral denotes the same component in the accompanying drawings, and a detailed description of known functions and configurations which may unnecessarily make the gist of the present invention unclear will be omitted.

Figure 2:
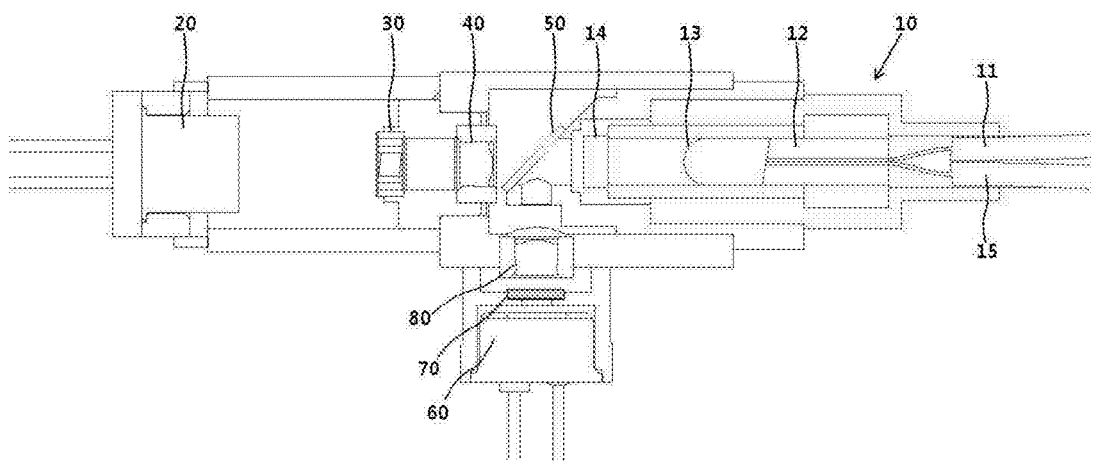
FIG. 2 is a view illustrating an optical transceiver module having a dual band pass WDM coupler according to an exemplary embodiment of the present invention embedded therein.
Figure 3:
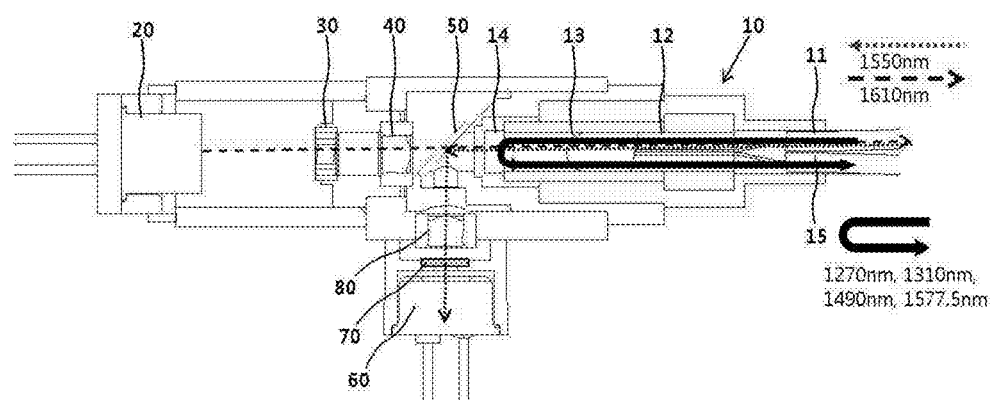
FIG. 3 is a view illustrating, for each of the wavelengths, moving paths of a transmission signal output from an optical transmitting unit and an optical signal input through a common port in the optical transceiver module of FIG. 2.

FIG. 2 is a view illustrating an optical transceiver module having a dual band pass WDM coupler according to an exemplary embodiment of the present invention embedded therein and FIG. 3 is a view illustrating, for each of wavelengths, moving paths of a transmission signal output from an optical transmitting unit and an optical signal input through a common port in the optical transceiver module of FIG. 2.

In order to use a video transceiver in an optical subscriber network according to an ITU-RG.983.3 standard, the video transceiver needs to be used by connecting an external WDM coupler to a bidirectional optical transceiver element.

In the video transceiver, a transmission signal uses a wavelength of 1610 nm, and a reception signal uses a wavelength of 1550 nm. However, as a wavelength of 1577.5 nm as a transmission wavelength of an optical line terminal (OLT) in 10GE-PON, XG-PON system is recently used, in order to couple the video transceiver to a PON system, four wavelengths of 1270 nm, 1310 nm, 1490 nm, and 1577.5 nm need to be returned to lines, and two wavelengths of 1550 nm and 1610 nm need to be input to the optical transceiver module.

To this end, the optical transceiver module according to the present invention includes a bidirectional optical transceiver element capable of transmitting and receiving an optical signal between a subscriber and a central station, and a dual band pass WDM coupler 10 providing separate pass bands for selectively passing two different wavelengths (i.e., a wavelength of a transmission signal and a wavelength of a reception signal).

The dual band pass WDM coupler 10 may include a common port 11, a dual core capillary, 12, a C lens 13, a dual band pass WDM filter 14, and a reflection port 15.

The common port 11 and the reflection port 15 may be an optical fiber, and serve as a passage through which an optical signal having a specific wavelength is input and output.

As illustrated in FIG. 3, optical signals having wavelengths of 1270 nm, 1310 nm, 1490 nm, 1550 nm, and 1577.5 nm may be input to the common port 11. The optical signals input to the common port 11 pass through the dual core capillary 12 and are incident on the C lens 13.

The C lens 13 serves to convert the optical signals incident through the common port 11 into parallel light, and the dual band pass WDM filter 14 selectively passes only an optical signal having a specific wavelength among the optical signals which are converted into the parallel light by the C lens 13, and reflects optical signals having other wavelengths.

As described above, in order to use the optical transceiver module as the video transceiver in the optical subscriber network according to the ITU-RG.983.3 standard, only the optical signal having the wavelength of 1550 nm among the optical signals input to the common port 11 is input to the optical transceiver module, and the optical signals having other wavelengths need to be returned to a line.

To this end, in the optical transceiver module according to the present invention, the dual band pass WDM filter 14 is used so that only the optical signal having the wavelength of 1550 nm among the optical signals input to the common port 11 is selectively passed, and the optical signals having other wavelengths (e.g., 1270 nm, 1310 nm, 1490 nm, and 1577.5 nm) are output to the reflection port 15.

The dual band pass WDM filter 14 provides a pass band for selectively passing only the optical signal having a specific wavelength (e.g., the optical signal having the wavelength of 1550 nm) among the optical signals input to the common port 11. Furthermore, the dual band pass WDM filter 14 simultaneously provides a pass band capable of passing a wavelength of a transmission signal output from the optical transmitting unit 20, other than the optical signal having the specific wavelength among the optical signals input to the common port 11.

Figure 4:
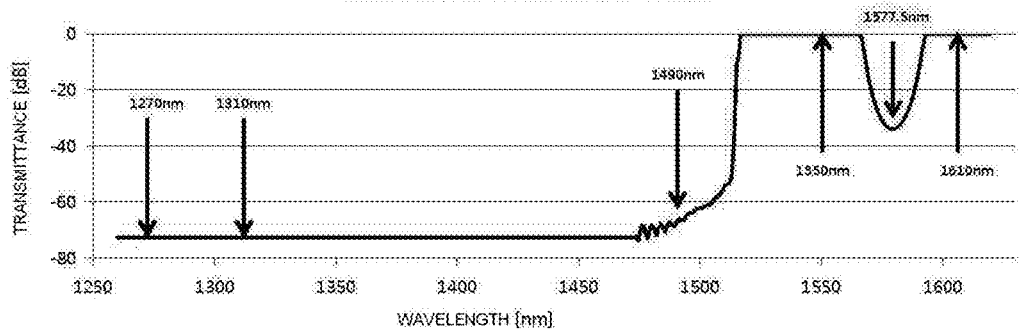
FIG. 4 is a view illustratively illustrating transmittance according to wavelengths of an optical signal input to the dual band pass WDM filter.
Figure 5:
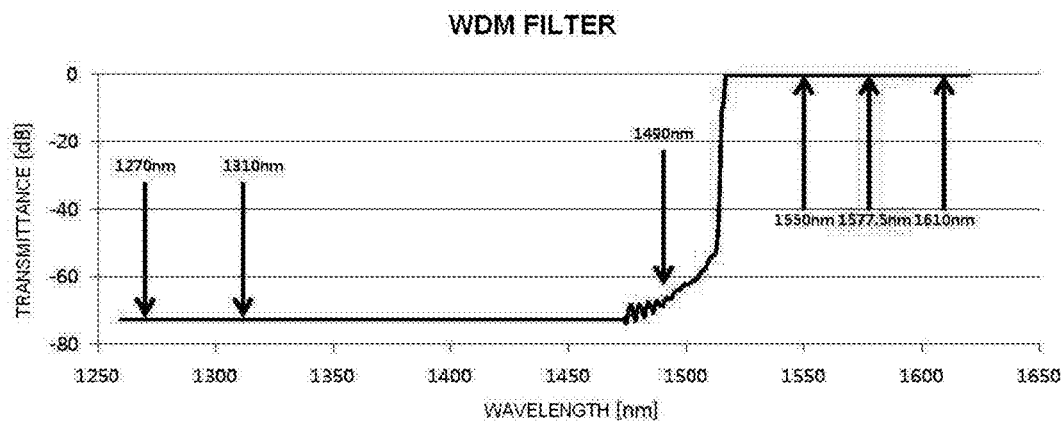
FIG. 5 is a view illustratively illustrating transmittance according to wavelengths of an optical signal input to a general WDM filter.

FIG. 4 is a view illustratively illustrating transmittance according to wavelengths of an optical signal input to the dual band pass WDM filter and FIG. 5 is a view illustratively illustrating transmittance according to wavelengths of an optical signal input to a general WDM filter. Here, the general WDM filter of FIG. 5 does not illustrate a WDM filter 50 described below, but illustrates filter characteristics of a WDM filter which is generally used to perform a comparison with characteristic of the dual band pass WDM filter 14, by way of example.

As illustrated in FIG. 4, the dual band pass WDM filter 14 provides a pass band for passing the optical signal having the wavelength of 1550 nm, among the optical signals having wavelengths of 1270 nm, 1310 nm, 1490 nm, 1550 nm, and 1577.5 nm which are input to the common port 11, thereby allowing the passed optical signal to be finally received by the optical receiving unit 60. In addition, the dual band pass WDM filter 14 reflects optical signals having other wavelengths (e.g., 1270 nm, 1310 nm, 1490 nm, and 1577.5 nm), thereby allowing the reflected optical signals to be finally incident on the reflection port 15 and to be output.

Furthermore, the dual band pass WDM filter 14 provides a pass band for passing an optical signal having a wavelength of 1610 nm other than the wavelength of 1550 nm, wherein the optical signal having the wavelength of 1610 nm corresponds to a transmission signal to be described below. That is, the dual band pass WDM filter 14 passes the transmission signal output from the optical transmitting unit 20, and allows the passed transmission signal to be finally incident on the common port 11 and to be output.

In contrast, the general WDM filter may provide pass bands for passing optical signals having the wavelength of 1610 nm used as the transmission signal and the wavelength of 1550 nm used as the reception signal, but may not perform an operation of reflecting the optical signal having the wavelength of 1577.5 nm at the same time, as illustrated in FIG. 5. In order to solve the above-mentioned problem, as illustrated in FIG. 1, a solution of a filter box form in which a plurality of general WDM couplers are combined in multiple stages has been considered, but this solution causes new problems in that the optical transceiver module becomes bulk, the optical transceiver module becomes expensive, and optical characteristics are degraded (i.e., optical insertion loss for the pass band is increased).

However, according to the present invention, since the dual band pass WDM coupler 10 providing the separate pass band for selectively passing the two different wavelengths is embedded in the optical transceiver module, the same effect as the optical transceiver module according to the related art in which the general WDM couplers are combined in the multiple stages may be obtained, a size of the optical transceiver module may be decreased compared to the related art, costs may be reduced, and the optical insertion loss for the pass band may also be decreased. In addition, according to the present invention, since cross-talk of the optical signal may be decreased by providing the separate pass bands, reliability of bidirectional optical transmission and reception may be significantly increased.

Meanwhile, the optical transceiver module according to an exemplary embodiment of the present invention includes optical transceiver elements for bidirectional optical transmission and reception.

The optical transmitting unit 20 is configured to include a light emitting element such as a laser diode (LD) and a condensing lens, and is a configuration that outputs the transmission signal.

An optical isolator 30, a parallel light lens 40, and a WDM filter 50 are aligned in line in a direction toward which the transmission signal output from the optical transmitting unit 20 is moved.

The optical isolator 30 serves to allow the transmission signal to be moved in the direction in which it is output from the optical transmitting unit 20, and to prevent the transmission signal reflected by the WDM filter 50, the dual band pass WDM filter 14, or the C lens 13 from being again incident on the optical transmitting unit 20 at the same time.

The parallel light lens 40 converts the transmission signal output from the optical transmitting unit 20 into parallel light.

The WDM filter 50 is installed to be inclined with respect to the moving direction of the transmission signal converted into the parallel light by the parallel light lens 40, thereby passing the transmission signal converted into the parallel light and reflecting the optical signal having the specific wavelength that passes through the dual band pass WDM filter 14. Here, the WDM filter 50 may be installed to be inclined at 45 degrees with respect to the moving direction of the transmission signal as illustrated in FIGS. 2 and 3. Accordingly, the optical signal that passes through the dual band pass WDM filter 14 is vertically reflected by the WDM filter 50.

The transmission signal that passes through the WDM filter 50 is incident on the dual band pass WDM filter 14 of the dual band pass coupler 10. The dual band pass WDM filter 14 has the pass band which is set to pass the wavelength of the transmission signal output from the optical transmitting unit 20 as described above. For example, as illustrated in FIG. 3, in the case in which a transmission signal having a wavelength of 1610 nm is output from the optical transmitting unit 20, the dual band pass WDM filter 14 may pass the transmission signal having the wavelength of 1610 nm. In addition, the transmission signal that passes through the dual band pass WDM filter 14 is incident on the C lens 13, and the C lens 13 concentrates the transmission signal which is incident thereon, thereby allowing it to be incident on the common port 11.

Meanwhile, the optical signal having the specific wavelength which passes through the dual band pass WDM filter 14 and is then reflected by the WDM filter 50 is input to the optical receiving unit 60, and the optical signal input to the optical receiving unit 60 as described above corresponds to the reception signal. The optical receiving unit 60 is configured to include a typical photo diode (PD), and may for example, receive only the optical signal having the wavelength of 1550 nm among the optical signals having multiple wavelengths input to the common port 11 as the reception signal, as illustrated in FIG. 3.

The dual band pass WDM filter 14 is configured to reflect the optical signal having the wavelengths other than 1550 nm among the optical signals having the multiple wavelengths input to the common port 11, but it may be difficult for the dual band pass WDM filter 14 to reflect the optical signals having the wavelengths other than 1550 nm to a high optical isolation level of −40 dB or less, as illustrated in FIG. 4.

Accordingly, an optical filter unit 70 for optical reception passing only the optical signal having the wavelength (e.g., 1550 nm) allocated to the optical receiving unit 60 among the optical signals having the specific wavelength reflected by the WDM filter 50 may be additionally interposed between the WDM filter 50 and the optical receiving unit 60. Here, the optical filter unit 70 for optical reception may be the same kind of filter as the WDM filter 50, and may be disposed to form an angle at 90 degrees with the moving direction of the optical signal reflected by the WDM filter 50.

The optical filter unit 70 for optical reception may more surely block the optical signals having the wavelengths other than 1550 nm from being input to the optical receiving unit 60, thereby making it possible to further increase reliability of bidirectional optical transmission and reception.

The optical transceiver module according to the present invention may further include a condensing lens 80 that concentrates the optical signals reflected by the WDM filter 50. In this case, the optical filter unit 70 for optical reception is disposed between the condensing lens 80 and the optical receiving unit 60, thereby making it possible to pass only the optical signal having the wavelength allocated to the optical receiving unit 60 among the optical signals having the specific wavelength concentrated by the condensing lens 80.

Hereinafter, pass band characteristics of the optical filter unit 70 for optical reception in the case in which the optical filter unit 70 for optical reception is disposed between the condensing lens 80 and the optical receiving unit 60 will be described by comparing with pass band characteristics of the optical filter unit 70 for optical reception in the case in which the optical filter unit 70 for optical reception is disposed between the WDM filter 50 and the condensing lens 80.

Figure 6:
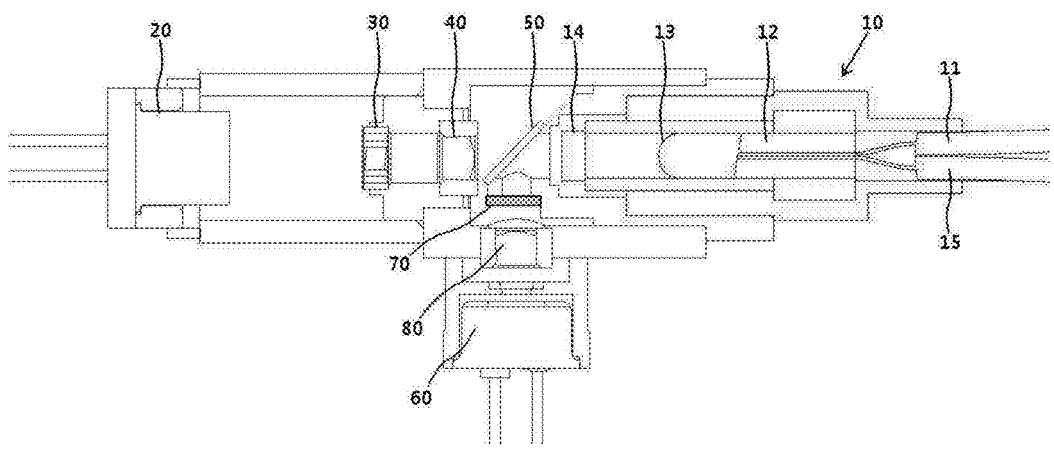
FIG. 6 is a view illustrating an optical transceiver module in which an optical filter unit for optical reception is disposed between a WDM filter and a condensing lens.
Figure 7:
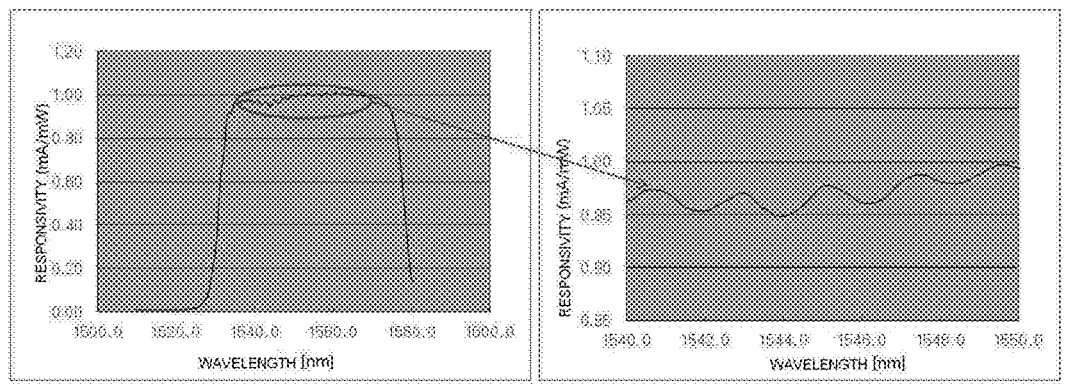
FIG. 7 is a view illustrating pass band characteristics of the optical filter unit for optical reception in the optical transceiver module of FIG. 6.

FIG. 6 is a view illustrating an optical transceiver module in which the optical filter unit 70 for optical reception is disposed between the WDM filter 50 and the condensing lens 80, and FIG. 7 is a view illustrating pass band characteristics of the optical filter unit 70 for optical reception in the optical transceiver module of FIG. 6.

In general, the optical transceiver module has the optical receiving unit 60 and the condensing lens 80 which are separately aligned while no component is interposed therebetween as illustrated in FIG. 6, or has the optical receiving unit 60 which is formed integrally with the condensing lens 80. In this case, the optical signal (the parallel light converted by the C lens 13) reflected by the WDM filter 50 to be incident toward the optical receiving unit 60 is concentrated by the condensing lens 80 to thereby be incident on the optical receiving unit 60.

In this case, in order to filter the optical signal incident on the optical receiving unit 60, the optical filter unit 70 for optical reception may be disposed between the WDM filter 50 and the condensing lens 80. However, in this case, it may be seen that a ripple excessively occurs in the pass band of the optical filter unit 70 for optical reception provided to pass the optical signal having the wavelength of 1550 nm, as illustrated in FIG. 7.

Figure 8:
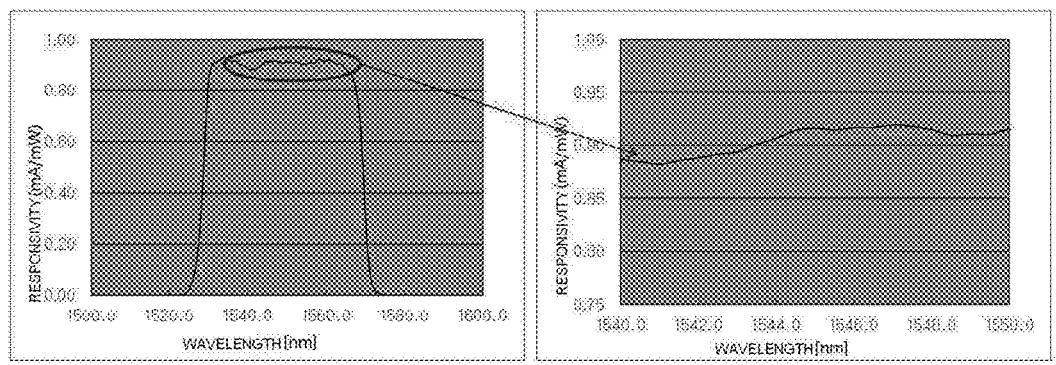
FIG. 8 is a view illustrating pass band characteristics of the optical filter unit for optical reception in the optical transceiver module of FIG. 2.

Meanwhile, FIG. 8 is a view illustrating pass band characteristics of the optical filter unit 70 for optical reception in the optical transceiver module of FIG. 2. More specifically, FIG. 8 is a view illustrating pass band characteristics of the optical filter unit 70 for optical reception in the case in which the condensing lens 80 and the optical receiving unit 60 are separately configured, and the optical filter unit 70 for optical reception is disposed between the condensing lens 80 and the optical receiving unit 60.

In the case in which the optical filter unit 70 for optical reception is disposed between the condensing lens 80 and the optical receiving unit 60, it may be confirmed that the ripple occurring in the pass band of the optical filter unit 70 for optical reception provided to pass the optical signal having the wavelength of 1550 nm is significantly reduced compared to the case in which the optical filter unit 70 for optical reception is disposed between the WDM filter 50 and the condensing lens 80.

The ripple occurring in the pass band of the optical filter unit 70 for optical reception occurs due to a reflection of the optical signal occurring on a surface of the optical filter unit 70 for optical reception in the case in which the optical signal passes through the optical filter unit 70 for optical reception. In this case, in the case in which the optical signal incident on the optical filter unit 70 for optical reception is converted into a form of focused light instead of the form of parallel light, as an amount of optical signal vertically incident on the optical filter unit 70 is decreased, an amount of reflection occurring on the surface of the optical filter unit 70 is decreased, thereby making it possible to significantly reduce the ripple occurring in the pass band of the optical filter unit 70.

Therefore, it is possible to prevent the ripple occurring in the pass band of the optical filter unit 70 by simultaneously including the optical filter unit 70 for optical reception for filtering the optical signal having the specific wavelength reflected by the WDM filter 50 and the condensing lens 80 focusing the parallel light in the optical transceiver module according to the present invention, and disposing the optical filter unit 70 for optical reception between the condensing lens 80 and the optical receiving unit 60.

As described above, although the present invention is described with reference to the limited exemplary embodiments and the drawings, the present invention is not limited to the above exemplary embodiments and can be variously changed and modified from the description by a person skilled in the art to which the present invention pertains. The spirit of the present invention is defined by only the appended claims, and all changes and modifications that fall within metes and bounds of the claims, or equivalents of such metes and bounds are therefore intended to be embraced by the range of the spirit of the present invention.

DETAILED DESCRIPTION OF MAIN ELEMENTS

10: dual pass band WDM coupler
11: common port
12: dual core capillary
13: C lens
14: dual band pass WDM filter
15: reflection port
20: optical transmitting unit
30: optical isolator
40: parallel light lens
50: WDM filter
60: optical receiving unit
70: optical filter unit for optical reception
80: condensing lens

What is claimed is:

1. An optical transceiver module having a dual band pass wavelength division multiplexing (WDM) coupler embedded therein, the optical transceiver module comprising:
   the dual band pass WDM coupler including a common port, a C lens converting optical signals input to the common port into parallel light, a dual band pass WDM filter passing an optical signal having a specific wavelength among the optical signals converted into the parallel light by the C lens and reflecting optical signals having other wavelengths, and a reflection port allowing the optical signals reflected by the dual band pass WDM filter and concentrated by the C lens to be incident thereon and to be output therefrom;
   an optical transmitting unit outputting a transmission signal;
   a parallel light lens converting the transmission signal output from the optical transmitting unit into parallel light;
   a WDM filter installed to be inclined with respect to a moving direction of the transmission signal converted into the parallel light by the parallel light lens, to thereby pass the transmission signal converted into the parallel light and reflect the optical signal having the specific wavelength passing through the dual band pass WDM filter; and
   an optical receiving unit receiving the optical signal having the specific wavelength reflected by the WDM filter,
   wherein the dual band pass WDM filter passes the transmission signal passing through the WDM filter, and the C lens concentrates the transmission signal passing through the dual band pass WDM filter to allow the concentrated transmission signal to be incident on the common port,
   wherein the optical signal having the specific wavelength and the transmission signal have different wavelengths,
   wherein the dual band pass WDM filter provides separate pass bands for selectively passing only the optical signal having the specific wavelength and the transmission signal.

2. The optical transceiver module of claim 1, further comprising an optical filter unit for optical reception disposed between the WDM filter and the optical receiving unit to pass only an optical signal having a wavelength allocated to the optical receiving unit among the optical signals having the specific wavelength reflected by the WDM filter.

3. The optical transceiver module of claim 2, further comprising a condensing lens concentrating the optical signals having the specific wavelength reflected by the WDM filter,
   wherein the optical filter unit for optical reception is disposed between the condensing lens and the optical receiving unit to pass only the optical signal having the specific wavelength allocated to the optical receiving unit among the optical signals having the specific wavelength concentrated by the condensing lens.

4. The optical transceiver module of claim 3, wherein the transmission signal output from the optical transmitting unit and incident on the common port has a wavelength of 1610 nm,
   the optical signals input to the common port have wavelengths of 1270 nm, 1310 nm, 1490 nm, 1550 nm, and 1577.5 nm,
   the optical signal passing through the dual band pass WDM filter and received by the optical receiving unit among the optical signals input to the common port has a wavelength of 1550 nm, and
   the optical signals reflected by the dual band pass WDM filter and concentrated by the C lens to be incident on the reflection port and output from the reflection port have the wavelengths of 1270 nm, 1310 nm, 1490 nm, and 1577.5 nm.

* * * * *